United States Patent
Hörder et al.

(10) Patent No.: US 12,508,925 B2
(45) Date of Patent: Dec. 30, 2025

(54) BATTERY PACK ARRANGEMENT FOR A VEHICLE

(71) Applicant: VOLVO TRUCK CORPORATION, Gothenburg (SE)

(72) Inventors: Jonatan Hörder, Mölndal (SE); Sondre Landvik, Gothenburg (SE); Sebastien Ragot, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 1156 days.

(21) Appl. No.: 17/284,283

(22) PCT Filed: Oct. 12, 2018

(86) PCT No.: PCT/EP2018/077941
§ 371 (c)(1),
(2) Date: Apr. 9, 2021

(87) PCT Pub. No.: WO2020/074105
PCT Pub. Date: Apr. 16, 2020

(65) Prior Publication Data
US 2021/0380001 A1    Dec. 9, 2021

(51) Int. Cl.
*B60L 50/60* (2019.01)
*B60K 1/04* (2019.01)
(Continued)

(52) U.S. Cl.
CPC .............. *B60L 50/66* (2019.02); *B60K 1/04* (2013.01); *B60L 50/64* (2019.02);
(Continued)

(58) Field of Classification Search
CPC ... B60L 50/64; H01M 50/249; H01M 50/244; H01M 10/655; H01M 10/6554;
(Continued)

(56) References Cited

U.S. PATENT DOCUMENTS 6,260,645 B1    7/2001  Pawlowski et al.
8,789,635 B2    7/2014  Franzen et al.
(Continued)

FOREIGN PATENT DOCUMENTS

CN    201329795 Y    10/2009
CN    201549540 U     8/2010
(Continued)

OTHER PUBLICATIONS

Chinese Office Action dated Feb. 9, 2023 in corresponding Chinese Patent Application No. 201880098496.7, 15 pages.
(Continued)

*Primary Examiner* — Christopher P Domone
(74) *Attorney, Agent, or Firm* — Jeffri A. Kaminski; Venable LLP

(57) ABSTRACT

The invention relates to a battery pack arrangement (40) for a vehicle (10) comprising a battery pack (43, 47, 49) having a first battery module (64) with a first set of battery cells (84), a second battery module (67) with a second set of battery cells (87), and a thermal management member (70) arranged there between, wherein the first battery module and the second battery module are arranged on opposite sides (72, 74) of the thermal management member (70), the thermal management member having a first thermally conductive surface (73) for regulating a temperature of the first battery module and a second thermally conductive surface (75) for regulating a temperature of the second battery module, wherein the battery pack arrangement further comprises a suspension attachment (80) configured to attach the battery pack arrangement in a generally vertical orientation to a vehicle frame (20) of the vehicle.

10 Claims, 8 Drawing Sheets

(51) Int. Cl.
*B60L 50/64* (2019.01)
*H01M 10/6568* (2014.01)
*H01M 50/204* (2021.01)
*H01M 50/244* (2021.01)
*H01M 50/249* (2021.01)

(52) U.S. Cl.
CPC ..... *H01M 10/6568* (2015.04); *H01M 50/204* (2021.01); *H01M 50/244* (2021.01); *H01M 50/249* (2021.01); *B60K 2001/0438* (2013.01); *B60L 2200/36* (2013.01); *B60L 2240/545* (2013.01)

(58) Field of Classification Search
CPC ....... H01M 10/6555; B60K 2001/0433; B60K 2001/0438
See application file for complete search history.

(56) References Cited

U.S. PATENT DOCUMENTS

| | | | |
|---|---|---|---|
| 2008/0318119 A1* | 12/2008 | Watanabe | H01M 10/613 429/99 |
| 2012/0009457 A1 | 1/2012 | Lee et al. | |
| 2012/0055725 A1 | 3/2012 | Mizoguchi et al. | |
| 2012/0073889 A1* | 3/2012 | Franzen | B60L 50/66 429/96 |
| 2014/0072835 A1 | 3/2014 | Tsujimura et al. | |
| 2015/0280184 A1 | 10/2015 | Utley et al. | |
| 2017/0263987 A1 | 9/2017 | Kopp et al. | |
| 2017/0288285 A1 | 10/2017 | Buckhout et al. | |
| 2018/0034122 A1 | 2/2018 | Newman | |
| 2018/0186227 A1 | 7/2018 | Stephens et al. | |
| 2018/0342716 A1* | 11/2018 | Chu | H01M 10/6555 |

FOREIGN PATENT DOCUMENTS

| | | |
|---|---|---|
| CN | 104786803 A | 7/2015 |
| CN | 104859717 A | 8/2015 |
| CN | 205282521 U | 6/2016 |
| CN | 107453007 A | 12/2017 |
| CN | 107579271 A | 1/2018 |
| CN | 107611520 A | 1/2018 |
| CN | 108382177 A | 8/2018 |
| CN | 207825911 U | 9/2018 |
| DE | 102011100626 A1 | 11/2012 |
| EP | 1852925 A1 | 11/2007 |
| JP | H01159358 U | 11/1989 |
| JP | 2008059849 A | 3/2008 |
| JP | 2011119284 A | 6/2011 |
| JP | 2013171662 A | 9/2013 |
| JP | 2017193300 A | 10/2017 |
| KR | 20170014924 A | 2/2017 |
| KR | 20170004028 U | 11/2017 |
| WO | 2010142687 A1 | 12/2010 |

OTHER PUBLICATIONS

Chinese Office Action dated Jun. 1, 2024 in corresponding Chinese Patent Application No. 201880098496.7, 28 pages.
International Search Report and Written Opinion dated Jun. 28, 2019 in corresponding International PCT Application No. PCT/EP2018/077941, 9 pages.
Koren Office Action dated Feb. 14, 2023 in corresponding Korean Patent Application No. 10-2021-7013677, 11 pages.
Chinese Office Action dated Aug. 18, 2023 in corresponding Chinese Patent Application No. 201880098496.7, 21 pages.
Chinese Decision of Rejection dated Aug. 31, 2024 in corresponding Chinese Patent Application No. 201880098496.7, 19 pages.
Chinese Office Action dated Feb. 17, 2025 in corresponding Chinese Patent Application No. 201880098496.7, 16 pages.
Chinese Notice of Grant dated Apr. 21, 2025 in corresponding Chinese Patent Application No. 201880098496.7, 6 pages.

* cited by examiner

BATTERY PACK ARRANGEMENT FOR A VEHICLE

CROSS-REFERENCE TO RELATED APPLICATIONS

This application is a U.S. National Stage application of PCT/EP2018/077941, filed Oct. 12, 2018, and published on Apr. 16, 2020, as WO 2020/074105 A1, all of which is hereby incorporated by reference in its entirety.

TECHNICAL FIELD

The invention relates to a battery pack arrangement for a vehicle, in particular a partly or fully electrical vehicle. The invention also relates to a vehicle frame arrangement comprising such a battery pack arrangement. Moreover, the invention relates to a vehicle comprising such a vehicle frame arrangement and battery pack arrangement. The invention is applicable on trucks, cars, buses and working machines within the fields of industrial construction machines or construction equipment, in particular partly or fully electric-powered vehicles and working machines. Although the invention will be described with respect to a truck, the invention is not restricted to this particular machine, but may also be used in other vehicles such as working machines, wheel loaders, articulated haulers, excavators, backhoe loaders, and also in other types of vehicles such as busses, cars, autonomous vehicles etc. Additionally, the invention may be used in a number of different types of electrical-powered vehicles such as fully electrical vehicles, partly electrical vehicles e.g. hybrid vehicles and vehicles having an internal combustion engine and an electrical machine, fuels cells and an electrical machine etc.

BACKGROUND

In the field of batteries and battery pack systems for vehicles, such as partly and fully electrical vehicles, there are several different types of arrangement for storing the batteries in the vehicles and for connecting the batteries to other components of the vehicle electric system, including e.g. the electric propulsion system.

The batteries in partly and fully electricals vehicles are used for powering not only the vehicle, but also other electric systems, thus there is an increasing demand on providing sufficiently powerful batteries to ensure a reliable operation of the vehicle. Such batteries are most often rechargeable batteries and consist of several battery cells that may be connected in series and/or in parallel forming a complete battery pack for the vehicle. In connection with arranging the batteries in the vehicles, it has been observed that there is a challenge in locating the batteries relative other systems and components of the vehicle due to requirements relating to space and performance.

Further, in connection with theses types of vehicles, efficient temperature control of the batteries is central to ensure a reliable operation of the batteries in ordinary use of the vehicle. By way of example, a too high temperature of the batteries may lower their performance and also shorten their lifetime. Thus, thermal management for batteries and other electric systems is central to the performance and longevity of the systems. In other words, the arrangement of the batteries in the vehicle is not only dependent on the available space in the vehicle, but also dependent on the possibilities of ensuring that the batteries can be arranged in the vehicle to operate under healthy conditions, including e.g. a healthy operational temperature.

In view of the above, it would be desire to improve the arrangement of batteries in a vehicle in order to provide a reliable operation of the vehicle and its electrical systems.

One conventional type of arrangement of a battery pack in a vehicle is to locate a cooling plate inside an essentially horizontally oriented and rectangular shaped battery pack. US 2017/0288285 A1 discloses another type of battery pack arrangement, in which a liquid cooled battery pack includes two sets of batteries cooled by an internal common channel. By way of example, FIG. 11 discloses a battery housing assembly. The housing includes two parts including cell cover walls. In addition, brackets may be attached to a portion of the cell cover walls. Coolant may be provided to and removed from the housing at coolant inlet/outlets. Further, a number of cell connection circuits may be disposed on opposite sides of, and parallel to, the common coolant channel. The common coolant channel may be oriented vertically within the housing so as to facilitate fluid circulation through the channel.

Despite the activity in the field, there remains a need for further improving an arrangement of batteries in a vehicle, such as a partly or fully electrical vehicle, while maintaining a balance between the costs, the number of components making up arrangement and the available space in the vehicle.

SUMMARY

An object of the invention is to provide a battery pack arrangement for a vehicle, such as a partly or fully electric vehicle, which arrangement aims at increasing packaging efficiency of the battery pack arrangement in a vehicle, while maintaining an efficient thermal management control of the battery modules making up the battery pack arrangement. The object is at least partly achieved by a battery pack arrangement according to claim 1. According to a first aspect of the present invention, there is provided a battery pack arrangement which comprises a battery pack having a first battery module with a first set of battery cells, a second battery module with a second set of battery cells, and a thermal management member arranged therebetween. The first battery module and the second battery module are arranged on opposite sides of the thermal management member. The thermal management member has a first thermally conductive surface for regulating a temperature of the first battery module and a second thermally conductive surface for regulating a temperature of the second battery module.

Further, the battery pack arrangement comprises a suspension attachment configured to attach the battery pack arrangement in a generally vertical orientation to a vehicle frame of a vehicle. By having a suspension attachment according to the example embodiments, it becomes possible to install the battery pack arrangement in a generally vertical installation to a vehicle frame of a vehicle.

In addition, by the example embodiments of the invention, it is believed that an optimized battery pack arrangement for a vehicle frame is provided in terms of space, design and flexibility. That is, the battery pack arrangement allows for modularity and flexibility in that the battery pack arrangement can more easily be adjusted to different types of vehicles with different wheelbases, and even include a combination of a set of battery packs, thereby being capable of being tailor-made for a certain type of vehicle, such as a heavy-duty vehicle with certain restrictions as to the wheelbase etc. In this context, it is believed that the provision of arranging the thermal management member in-between the first battery module and the second battery module at least partly contribute to the modularity and flexibility as well as the compactness of the battery pack arrangement. For instance, since the battery modules are connected to the thermal management member, each one of the battery modules are not required to be separately attached to the vehicle frame. Accordingly, the thermal management member provides a mechanical structure to the battery modules, while the arrangement of the battery modules to the thermal management member provides for modularity and flexibility, yet ensuring a sufficient level of temperature control of the battery pack. In addition, the example embodiments provides for a quick installation of the battery pack arrangement on the vehicle in serial production.

To this end, by arranging the first battery module and the second battery module on opposite sides of the thermal management member, the thermal management member is configured to act as a load bearing structure. That is, the thermal management member is arranged as a load bearing structure for the battery modules. Typically, the thermal management is arranged in a vertical orientation along the first and second battery modules. Hence, the thermal management member is a load bearing vertical thermal management member. While the thermal management member is typically configured to cool the battery modules, it may also be configured to heat the battery modules if the temperature(s) of one or both of them falls below a critical temperature.

By the provision of a thermal management member having a first thermally conductive surface for regulating a temperature of the first battery module and a second thermally conductive surface for regulating a temperature of the second battery module, the thermal management member is configured to cool and/or heat the opposite arranged first and second battery modules, respectively.

The example embodiments are particularly useful for an electric-powered vehicle, such as an electric truck, electric bus or the like, i.e. a full electric machine. However, the example embodiments may likewise be installed in a partly electric-powered vehicle, such as a hybrid vehicle.

According to one example embodiment, the battery pack has a first longitudinal outer recess for accommodating a portion of the vehicle frame and a second longitudinal outer recess for accommodating another portion of the vehicle frame. One example advantage with a battery pack having such outer recesses is that the battery pack arrangement can be attached to the vehicle frame in an even more space saving manner.

The suspension attachment of the battery pack arrangement should be capable of attaching the battery pack arrangement in a suspended state relative the vehicle frame. That is, when the battery pack arrangement is attached to the vehicle frame, the battery pack arrangement is suspended from the vehicle frame in a vertical orientation. Thus, the battery pack arrangement is hanging down from the vehicle frame. The suspension attachment can be provided in several different manners. By way of example, the suspension attachment comprises a fastener. One example of a fastener is a bolt or screw. Typically, although strictly not required, the suspension attachment comprises a plurality of spaced-apart attachment points. In this manner, it becomes possible to at least partly isolate the battery pack arrangement from the vehicle frame, thereby avoiding, or at least reducing the risk of, torsional frame loads to affect the battery cell modules. It is believed that a number of spaced-apart attachment points provides for an improved capability to handle movement from the vehicle frame during operation of the vehicle. The number of attachment points can be distributed in any one of a longitudinal direction, transverse direction and vertical direction. By way of example, the number of attachment points is three. Thus, in one example embodiment, the suspension attachment is a three-point suspension attachment having three attachment points. It should be noted that the number of suspension attachment points can be fewer than three as well as more than three for other types of installations and vehicles. By way of example, the attachment points are provided with a dampener having a dampening material such as a rubber material to further improve the capability of handling movement of the vehicle frame during operation of the vehicle. The dampener is typically arranged in-between the fastener of the suspension attachment and the parts of the battery back. However, the dampener can be arranged in other way in the suspension attachment. By way of example, the dampener may be arranged about the fastener of the suspension attachment and in between the suspension attachment and the vehicle frame. Hence, according to one example embodiment, the suspension attachment comprises a number of attachment points, wherein each one of the attachment points comprises a fastener and a dampener.

According to one example embodiment, at least one of the attachment points is disposed along the first longitudinal outer recess and at least one of the attachment points is disposed along the second longitudinal outer recess. In this manner, the mechanical stability of the attachment to the frame is further increased, which will typically have a positive impact on the overall stability of the battery pack arrangement.

According to one example embodiment, the battery pack arrangement further comprises a support structure arranged to at least partly encompassing the battery pack. According to one example embodiment, the support structure is configured to completely encompass the battery pack.

By way of example, the support structure comprises a first portion releasable connected to a second portion. In this manner, the flexibility of the arrangement is improved.

According to one example embodiment, the suspension attachment is arranged on the support structure. As the support structure encompasses the battery pack, the suspension attachment is arranged directly on the support structure, while indirectly on the thermal management member. Alternatively, the suspension attachment can be arranged directly on the thermal management member. Alternatively, the suspension attachment can be arranged directly on any one of the first and second battery modules. It is also conceivable that when the suspension attachment comprises a plurality of attachment points, the attachment points can be arranged on any one of the components making up the battery pack arrangement, e.g. on top of the battery modules and on top of the thermal management member.

It should also be noted that the battery pack can be provided without the support structure, and the suspension attachment is thus arranged on the battery pack at another part, e.g. directly or indirectly connected to the thermal management member.

Typically, the support structure of the battery pack arrangement is a separate part of the battery pack arrangement and encompasses the battery pack(s). Alternatively, the support structure may be an integral part of the battery pack arrangement. For example, the support structure may be part of any one of the first and second battery modules.

According to one example embodiment, the battery pack is a first battery pack, and the battery pack arrangement further comprises a second battery pack. It is also possible that the battery pack arrangement comprises additional battery packs according to the example embodiments. Thus the battery pack arrangement typically, although strictly not required, comprises a number of battery packs.

Typically, each one of the battery packs comprises an envelope for encompassing the first battery module and the second battery module. Typically, the envelope comprises a first portion and a second portion releasably connected to each other. One example advantage with the envelope is to protect the battery modules from the outside environment, e.g. from dirt or humidity. Hence, the envelope may be made from a protective and water-proof material, e.g. a plastics material, a metal such as steel or stainless steel. It also conceivable that the envelope may encompass one single battery module. It also conceivable that the envelope may encompass a plurality of battery modules. It is also conceivable that the envelope may encompass a complete battery pack.

The battery pack arrangement has an extension in a longitudinal direction and in a vertical direction. Thus, the thermal management member is arranged in-between the first battery module and the second battery module in the longitudinal direction. Also the opposite sides of the thermal management member extends in the vertical direction, i.e. the opposite sides are vertical opposite sides. Hence, the first battery module and the second battery module are arranged on opposite vertical sides of the thermal management member.

According to one example embodiment, the first thermally conductive surface for regulating a temperature of the first battery module and the second thermally conductive surface for regulating a temperature of the second battery module correspond to the opposite sides of the thermal management member, respectively. That is, the first thermally conductive surface is arranged on a first side of the thermal management member, while the second thermally conductive surface is arranged on a second side of the thermal management member. Typically, the first thermally conductive surface is a vertical oriented thermally conductive surface of the thermal management member, while the second thermally conductive surface is a vertical oriented thermally conductive surface of the thermal management member. In addition, or alternatively, the first side of the thermal management member is a vertical oriented side of the of the thermal management member, while the second side of the thermal management member is a vertical oriented opposite side of the of the thermal management member.

According to one example embodiment, the thermal management member comprises a fluid circuit configured to define a fluid passageway for circulating a coolant therethrough. The fluid circuit has an inlet for liquid inflow and an outlet in fluid communication with the inlet, for outflow of the liquid, the fluid passageway being defined at least by the thermally conductive plates disposed on opposite sides of the channel, both plates configured to be placed into thermal contact with at least one battery.

Typically, the thermal management member further comprises a liquid coolant in the channel. One example of a suitable liquid is water and ethylene glycol mixture. The coolant may also be an oil, or a combination of oil and a water-based fluid. In another example, the coolant may be a fluid such as a gas. It should be noted that the thermal management plate member also comprises the coolant. In addition, the coolant in this example is contained in a fluid circuit, corresponding to the channel. Accordingly, in the fluid circuit, a liquid coolant is transportable, typically with the aid of pump units. The liquid coolant can be used to remove heat from the battery pack and also to provide heating of the battery pack for fast charging at low temperatures, and/or for more rapid cold start.

By way of example, the thermal management member is a thermal management plate member. In particular, the thermal management plate member is an essentially flat plate member.

The thermal management member can be made from several different materials, or a combination of materials. By way of example, the thermal management member is made of a conductive material, such as a conductive metal, e.g. the aluminum, aluminum alloys, copper and/or gold. These types of material provide a sufficient level of thermal conductivity, while withstanding various stresses, loads. In addition, these types of materials are relatively machinable, and thus useful as materials for thermal management plate members.

According to one example embodiment, the battery pack arrangement further comprises a battery management control unit adapted to control the battery pack arrangement. For ease of reference, the battery management control unit may simple be denoted as the control unit. By way of example, the control unit is adapted to monitor the temperature of the battery modules of the battery pack. In addition, or alternatively, the control unit is adapted to set the temperature level of the battery modules of the battery pack arrangement. By way of example, the control unit may be adapted to regulate the temperature level of a first temperature of the first battery module and the temperature level of a second temperature level of the second battery module. It should be noted that the control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

It is to be noted that the first battery module and the second battery module are typically fixedly attached to the thermal management conductive member. The first battery module and the second battery module may as an example be fixedly attached to the thermal management member by a fastening system or a number of fastening members, such as a number of bolts, screws or the like. The first and second battery modules are typically located adjacent to each other such that they can be connected to the thermal management member in an easy manner.

It is to be noted that the battery pack arrangement can include one or several number of battery pack(s). In addition, or alternatively, each one of the battery packs can include a plurality of battery modules as described herein. In addition, or alternatively, it is to be noted that the battery pack arrangement can include different types of batteries. By way of example, any one of the battery modules in the battery pack arrangement is any one of a lithium-ion battery or sodium-ion battery. A sodium-ion battery typically includes any type of sodium iron battery or sodium ferrite battery. The battery pack arrangement thus typically comprises a set of battery packs. Also, it is to be noted that the battery pack, and the battery module, is generally a so called high voltage battery pack. In this context, the term "high voltage" refers to a battery pack of about 400-1000 voltage (V). Further, the term "power", as used herein, typically refers to electrical power.

According to a second aspect of the present invention, there is provided a vehicle frame arrangement. The vehicle frame arrangement comprises a vehicle frame and a battery pack arrangement. The battery pack arrangement comprises a first battery module having a first set of battery cells, a second battery module having a second set of battery cells, and a thermal management member arranged therebetween. The thermal management member is configured to regulate a temperature of the first battery module and the second battery module, respectively. Moreover, vehicle frame arrangement comprises a suspension attachment for mounting of the battery pack arrangement to the vehicle frame.

Typically, the battery pack arrangement comprises the suspension attachment for suspension mounting of the battery pack arrangement to the vehicle frame. However, it is also possible that the vehicle frame comprises the suspension attachment for suspension mounting of the battery pack arrangement to the vehicle frame.

Effects and features of the second aspect are largely analogous to those described above in relation to the first aspect of the present invention.

In particular, by the provision of having a suspension attachment for suspension mounting of the battery pack arrangement to the vehicle frame, the vehicle frame arrangement according to the example embodiments provides for attachment of the battery pack to the vehicle frame in an essentially vertical orientation relatively the vehicle frame. Thus, the example embodiments provide for attachment of the battery modules and the thermal management member in an essentially vertical orientation relatively the vehicle frame.

Typically, when the battery pack arrangement is suspension mounted to the vehicle frame, a substantial part of the battery pack arrangement is located underneath the vehicle frame, as seen in the vertical direction. By way of example, when the battery pack arrangement is suspension mounted to the vehicle frame, the battery pack arrangement is arranged below a vertical upper surface of the vehicle frame. Typically, the vertical upper region, e.g. the vertical upper surface of the battery pack arrangement is suspension mounted to the vehicle frame such that the vertical upper surface is essentially in parallel with the vehicle frame. In this manner, a substantial part of the battery pack arrangement is located underneath the vehicle frame, as seen in the vertical direction, thereby enabling the battery pack arrangement to be located in a space-efficient manner in the vehicle Also, any one of the example embodiments and/or the features as described above in relation to the first aspect of the present invention may likewise be included in the vehicle frame arrangement according to the second aspect or any other example embodiments of the second aspect.

According to one example embodiment, the battery pack arrangement comprises a plurality of the battery packs, wherein each one of the battery packs is individually suspension mounted to the vehicle frame. To this end, it becomes possible to provide a modular battery pack arrangement, in which one or more battery packs can be individually detachable from the vehicle frame.

According to one example embodiment, the battery pack arrangement is shaped to accommodate a bottom part of the vehicle frame. By way of example, the battery pack arrangement has a first longitudinal outer recess and a second longitudinal outer recess. The first longitudinal outer recess and the second longitudinal outer recess are arranged on a top part of the battery pack arrangement. The top part of the battery pack arrangement is thus the vehicle frame facing side of the battery pack arrangement. That is, the first longitudinal outer recess and the second longitudinal outer recess are arranged on the vehicle frame facing side of the battery pack arrangement.

Typically, when the battery pack arrangement is suspension mounted to the vehicle frame, the thermal management member is in a generally vertical orientation relative the vehicle frame.

According to one example embodiment, the suspension attachment comprises a plurality of spaced-apart attachment points enabling the battery pack arrangement to be attached to the vehicle frame via a plurality of locations. By way of example, the suspension attachment comprises a number of three spaced-apart attachment points enabling the battery pack arrangement to be attached to the vehicle frame at three different locations. However, the attachment points may also be two or more, so as to enable the battery pack arrangement to be attached to the vehicle frame at least in more than two locations. According to one example embodiment, the suspension attachment comprises a plurality of spaced-apart attachment points in the longitudinal direction and in the transverse direction, enabling the battery pack arrangement to attach to the vehicle frame at transversely opposite sides thereof and at longitudinal different locations. According to one example embodiment, the suspension attachment comprises a plurality of transversely spaced-apart attachment points enabling the battery pack arrangement to attach to the vehicle frame at transversely opposite sides. According to one example embodiment, the suspension attachment comprises a plurality of longitudinal spaced-apart attachment points enabling the battery pack arrangement to attach to the vehicle frame at longitudinal different locations.

By way of example, the battery pack arrangement is arranged along a longitudinal direction of the vehicle frame and between a first ground engaging member and a second ground engaging member. One example of a ground engaging member is a wheel. Another example of a ground engaging member is a track. Typically, one or more electrical machines are configured for driving at least a ground engaging member, or a pair of ground engaging members. The electrical machine(s) can be coupled to the ground engaging members in several different manners. In one example embodiment, the electrical machine(s) is coupled to a pair of ground engaging members by means of a transmission and a clutch. The transmission typically comprises a number of gears including a neutral gear. By way of example, the electrical machine(s) is arranged to be decoupled from the ground engaging members by means of e.g. the clutch or the neutral gear, allowing the electrical machine(s) to rotate, while the vehicle is at stand still.

According to one example embodiment, the vehicle frame arrangement further comprises a support structure for a first battery pack arrangement and a second battery pack arrangement. In this example embodiment, the suspension attachment is typically, although strictly not required, arranged on the support structure.

According to one example embodiment, the vehicle frame arrangement comprises a plurality of inter-connectable battery packs. In addition, or alternatively, the vehicle frame arrangement comprises a plurality of inter-connectable battery pack arrangements.

According to one example embodiment, the first battery module and the second battery module are arranged on opposite sides of the thermal management member. The thermal management member comprises a first thermally conductive surface for regulating a temperature of the first battery module and a second thermally conductive surface for regulating a temperature of the second battery module.

The vehicle frame of the vehicle typically comprises a lower frame part. In this type of example embodiments, the battery pack arrangement is typically connected to the lower frame part of the vehicle frame. However, the battery pack arrangement may likewise be connectable to another part of the vehicle frame such a side part, an upper part or a combination thereof.

According to a third aspect of the present invention, there is provided a vehicle comprising a battery pack arrangement according to any one of the example embodiments and/or the features as described above in relation to the first aspect of the present invention and/or a vehicle frame arrangement according to any one of the example embodiments and/or the features as described above in relation to the second aspect of the present invention.

Effects and features of the third aspect are largely analogous to those described above in relation to the first aspect of the present invention.

In addition, the vehicle may comprise a chassis. Further, the vehicle typically comprises an electric propulsion system including the battery pack arrangement. The vehicle may be an electrical, hybrid, or plug-in hybrid vehicle. Thus, the vehicle may be a fully electrical vehicle or a partly (i.e. a hybrid) electrical vehicle. The vehicle comprises typically comprises at least one electric machine, but may include additional electrical machines. The electrical machine(s) are configured to provide propulsion for the vehicle. Generally, the term "electric propulsion system", as used herein, typically refers to vehicle electrical components for providing energy (such as traction energy) and for storing energy (delivering and receiving energy). In other words, an electric propulsion system refers to a system configured to provide propulsion to a vehicle by converting electrical energy to mechanical energy, the electrical energy provided by means of the energy storage system, such as the battery pack arrangement. Besides the electrical components as mentioned above, an electric propulsion system may include additional components such as cable(s), sensor(s), control units, battery management unit(s) etc. The electric propulsion system is in particular configured to deliver and receive energy for providing propulsion to the vehicle, but also for performing various vehicle operations of the vehicle.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The various example embodiments of the invention, including its particular features and example advantages, will be readily understood from the following illustrative and non-limiting detailed description and the accompanying drawings, in which.

DETAILED DESCRIPTION OF EXAMPLE EMBODIMENTS OF THE INVENTION

Figure 1:
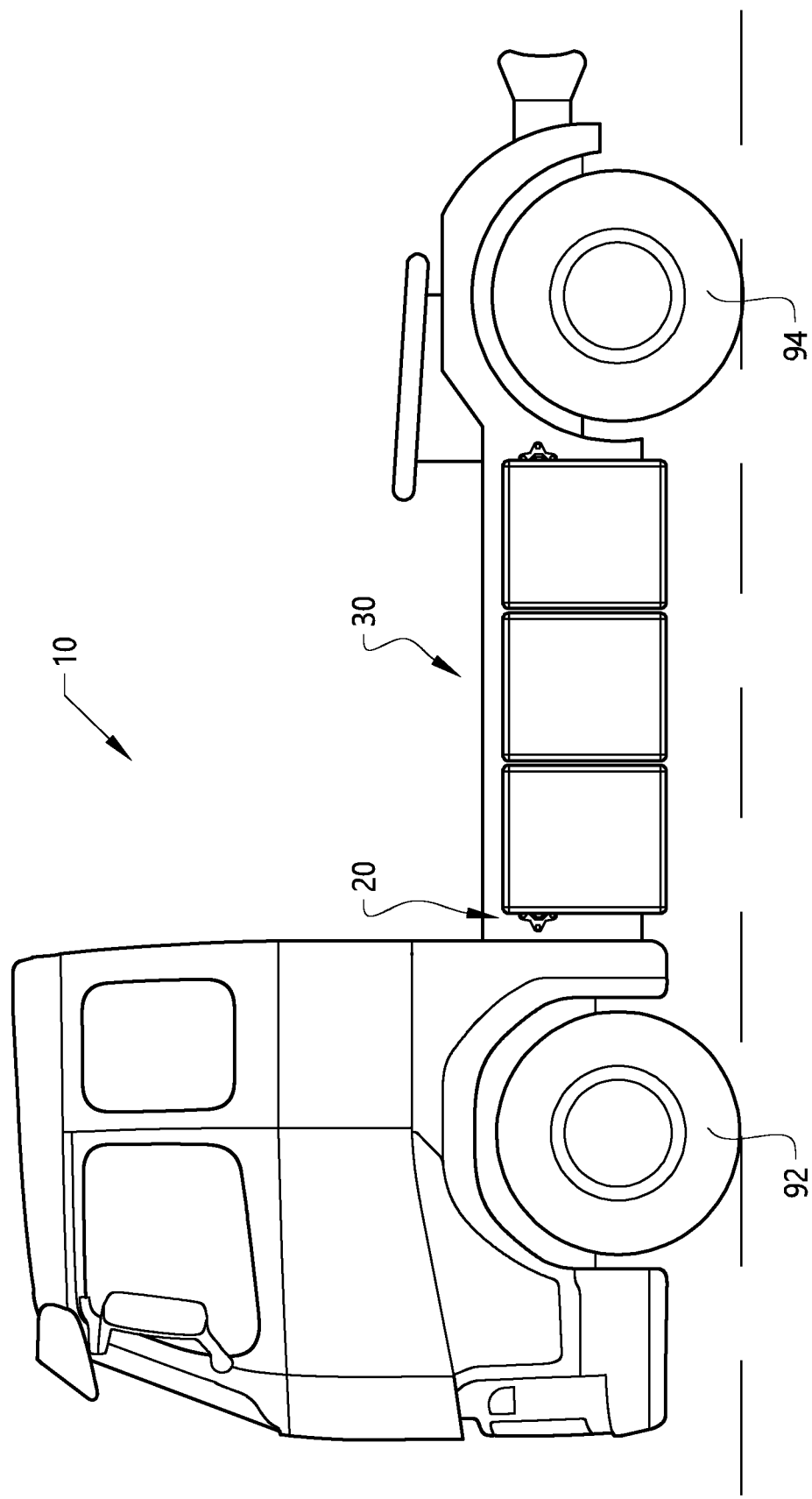
FIG. 1 is a perspective view of a vehicle in the form of an electric-powered truck including an example embodiment of an arrangement according to the present invention.

The present invention will now be described more fully hereinafter with reference to the accompanying drawings, in which exemplary embodiments of the invention are shown.

The invention may, however, be embodied in many different forms and should not be construed as limited to the embodiments set forth herein; rather, these embodiments are provided for thoroughness and completeness. Like reference characters refer to like elements throughout the description. The drawings are not necessarily to scale and certain features may be exaggerated in order to better illustrate and explain the exemplary embodiments of the present invention.

Referring now to the figures and e.g. FIG. 1*a* there is depicted a vehicle 10 in the form of a truck, in particular an electric-powered heavy-duty truck. The electric-powered truck is a fully electric truck. This type of vehicle typically comprises an electric propulsion system (not shown) for providing propulsion to the electrical truck. Besides providing propulsion to the vehicle, the electric propulsion system or parts of system can manage other electronic functions of the vehicle. The electric propulsion system generally comprises an energy storage system such as a battery pack arrangement 40, as illustrated in e.g. FIGS. 2*a* and 2*b*. The battery pack arrangement is configured to power one or more electric components such as electrical machines. The vehicle may further comprise a battery management unit (not shown) which is configured to control and monitor the battery pack arrangement.

Moreover, the electric propulsion system typically comprises one or more electric machines (not shown). The electrical machine is configured for driving a pair of ground engaging members, e.g. 92 and/or 94. In this example, the ground engaging members are provided in the form of wheels. Optional, the electrical propulsions system comprises a transmission (not shown) for transmitting a rotational movement from the electric machine to a propulsion shaft, sometimes denoted as the driven shaft. The propulsion shaft connects the transmission to the pair of wheel. Furthermore, although not shown, the electrical machine is typically coupled to the transmission by a clutch. The electrical machine can also be decoupled from the wheels by means of engaging a neutral gear of the transmission.

In addition, the vehicle comprises a vehicle frame 20. In this example, the vehicle frame 20 and the battery pack arrangement forms a vehicle frame arrangement 30, as will further be described hereinafter in relation to FIGS. 2a to 6.

Figure 2A:
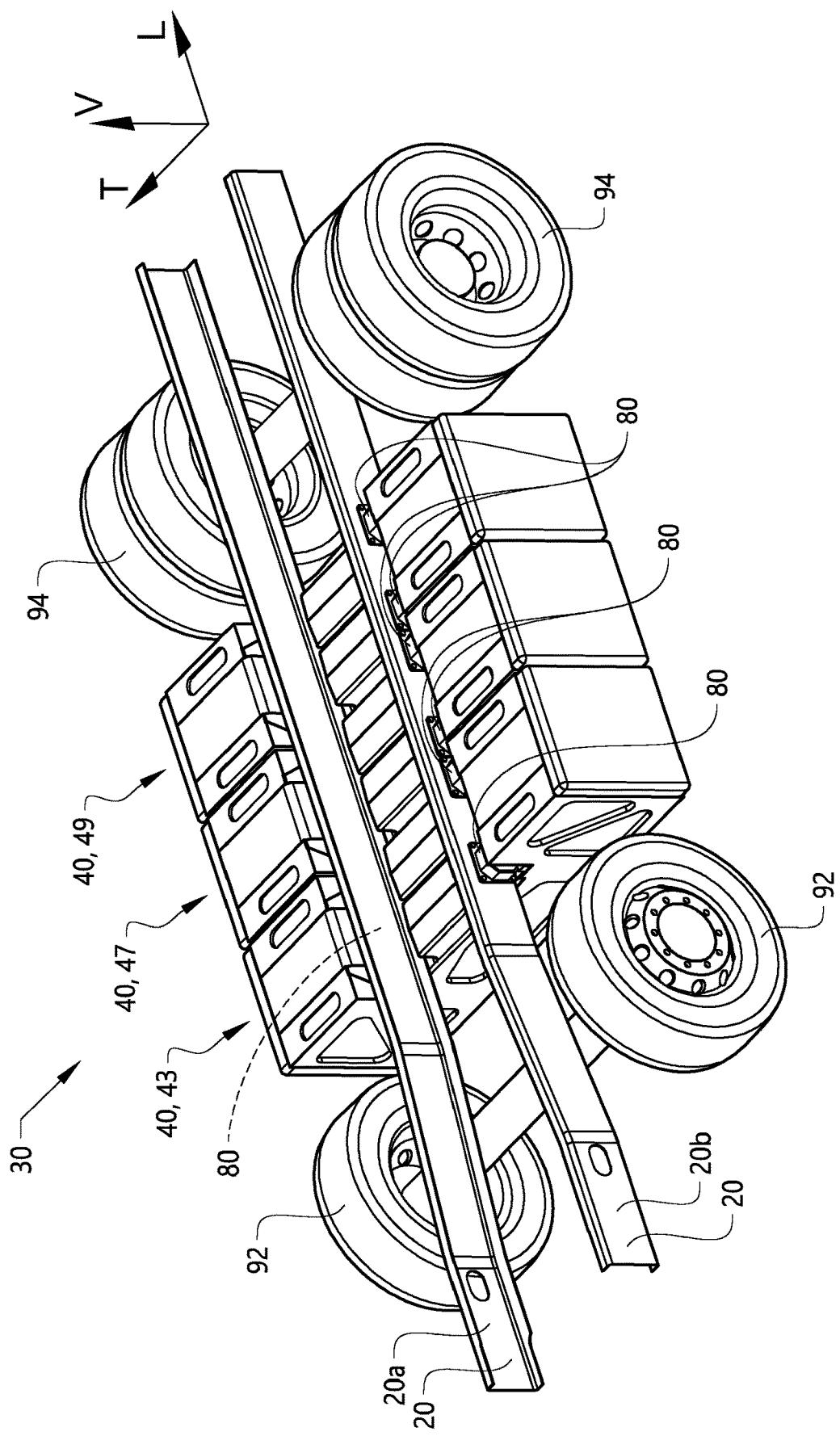
FIG. 2*a* is a perspective view of a vehicle frame arrangement according to an example embodiment of the present invention.

As is clearly shown in the FIGS. 2 to 6, e.g. in FIG. 2a, the vehicle frame arrangement 30 extends in at least a longitudinal direction L, a vertical direction V and a transversal direction T. The longitudinal direction L of the vehicle frame arrangement is generally parallel to an intended direction of travel of the vehicle 10. Hence, the longitudinal direction L of the vehicle frame arrangement generally coincides with the longitudinal direction of the vehicle 10. Further, the transversal direction T is generally perpendicular to each one of the vertical direction V and the longitudinal direction L. That is, the transversal direction T is parallel to the general extension of the vehicle frame 20. These directions are intended to be interpreted relative the vehicle, and should not be interpreted as being dependent of the vehicle's orientation. As is evident from the above, also the vehicle frame 20 extends in at least the longitudinal direction L, the vertical direction V and the transversal direction T. Analogously, the battery pack arrangement 40 extends in at least the longitudinal direction L, the vertical direction V and the transversal direction T. It should be noted that the terms top, above, upper, upward, below, lower, underneath, downward, bottom, lateral and side as well as any other similar terms are used in reference to the position of the battery pack arrangement relative the vehicle frame as depicted in the drawings, e.g. FIGS. 2a, 2b and FIGS. 3 to 6. It is also to be understood that the examples illustrated in the attached drawings, and described in the following specification are simply exemplary embodiments. Hence, dimensions and other physical characteristics relating to the embodiments disclosed herein are not to be considered as limiting, unless the appended claims expressly state otherwise.

Turning now again to the vehicle frame arrangement 30 comprising the vehicle frame 20 and the battery pack arrangement 40, one example embodiment is depicted in FIG. 2a. FIG. 2a is a perspective view of a vehicle frame arrangement according to an example embodiment of the present invention. The vehicle frame arrangement in FIG. 2a can be incorporated in the vehicle described above in relation to FIG. 1. In this example, the vehicle frame arrangement 30 comprises the vehicle frame 20 and the battery pack arrangement 40 comprising a number of battery packs 43, 47, 49 distributed along the longitudinal direction L of the vehicle frame 30.

Moreover, the battery pack arrangement 40 further comprises a suspension attachment 80 for suspension mounting of the battery pack arrangement to the vehicle frame. The suspension arrangement is configured to arrange the battery pack arrangement in an essentially vertical orientation. That is, the vertical direction of the battery pack arrangement generally coincides with the vertical direction of the vehicle frame, and the vertical direction of the vehicle. As depicted in FIG. 2a, the battery pack arrangement 40 comprises a suspension attachment 80 having a plurality of attachment points for suspension mounting of the battery pack arrangement to the vehicle frame at a plurality of points along the vehicle frame part 20a and the vehicle frame part 20b. The suspension attachment points are distributed both transversely and longitudinal along the vehicle frame enabling the battery pack arrangement to attach to the vehicle frame at transversely opposite sides 20a and 20b.

Moreover, in FIG. 2a, the battery pack arrangement 40 is arranged along the longitudinal direction L of the vehicle frame and between a first ground engaging member 92 and a second ground engaging member 94. In other words, the battery pack arrangement is arranged within the wheelbase of the vehicle.

Further, the vehicle frame arrangement, and thus the battery pack arrangement here comprises a plurality of battery packs 43, 47 and 49. In this example, the plurality of the battery packs are also individually suspension mounted to the vehicle frame 20. To this end, it becomes possible to provide a modular battery pack arrangement, in which one or more battery packs can be individually detachable from the vehicle frame. In addition, or alternatively, the battery packs can be inter-connected to each other. In this manner, the battery packs are inter-connectable battery packs, thus forming an inter-connected battery pack arrangement, which are connected to the vehicle frame 20. For instance, the battery pack arrangement comprises three battery packs. The number of battery packs in the battery pack arrangement varies depending on type of vehicle and type of installation, etc. Further features and example embodiments of the battery pack arrangement in FIG. 2a will be described in relation to the FIGS. 3 to 6.

Figure 2B:
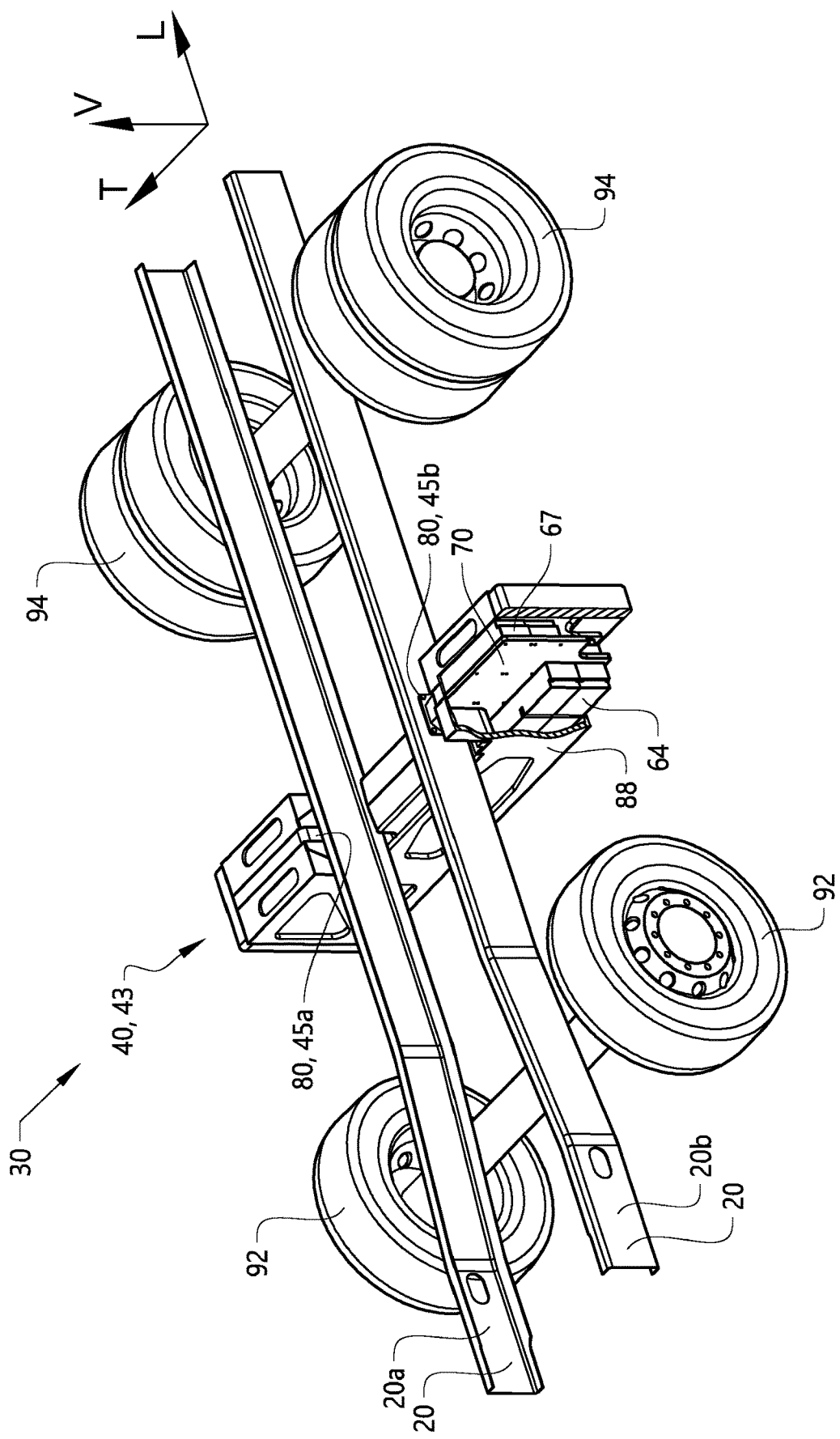
FIG. 2*b* is a perspective view of a vehicle frame arrangement, in which parts of a battery pack arrangement according to an example embodiment of the present invention is illustrated in a partly cross sectional view.

Referring now to FIG. 2b, there is depicted another example embodiment of a vehicle frame arrangement according to the invention. FIG. 2b is a perspective view of a vehicle frame arrangement, in which parts of a battery pack arrangement according to an example embodiment of the present invention is illustrated in a partly cross sectional view. As illustrated in FIG. 2b, the battery pack arrangement 40 here comprises one single battery pack 43. The battery pack arrangement 40 is suspension mounted to the vehicle frame 20, e.g. by the suspension attachment 80 having attachment points 45a and 45b connecting the battery pack arrangement 40 to the vehicle frame at transversely opposite sides along the frame portions 20a and 20b, respectively. In other words, there is provided a vehicle frame arrangement 30 comprising the vehicle frame 20 and the battery pack arrangement 40. It should be noted that this example of the battery pack arrangement may also comprise a suspension attachment having three attachment points, as described in relation to the example in FIG. 2a.

In addition, as illustrated in FIG. 2b, the battery pack arrangement 40 having the battery pack 43 here comprises a first battery module 64 having a first set of battery cells and a second battery module 67 having a second set of battery cells. The battery pack 43 also comprises a thermal management member in the form of a thermal management plate member 70 arranged between the first and second battery modules 64 and 67, respectively. The thermal management plate member is configured to regulate a temperature of the first battery module 64 and the second battery module 67, respectively. The thermal management plate member is thermally conductive. Moreover, as illustrated in FIG. 2b, when the battery pack arrangement 40 is suspension mounted to the vehicle frame, the thermal management plate member 70 is in a generally vertical orientation relative the vehicle frame 20. Accordingly, the vertical direction of the thermal management plate member generally coincides with the vertical direction of the vehicle frame, and also with the vertical direction of the vehicle.

The battery pack, in particular the battery modules, may be sensitive to temperature changes and often needed to be operated at an appropriate temperature or within an appropriate temperature range. By way of example, each one of the battery modules is a lithium-ion battery. Moreover, each one of battery modules comprises a number of battery cells. The number of battery cells in each battery module and the overall number of battery cells varies depending on type of vehicle and type of installation, etc.

As illustrated in FIG. 2b, and further in FIG. 5, the first battery module 64 and the second battery module 67 are arranged on opposite sides 72, 74 of the thermal management plate member 70. The opposite sides 72, 74 are vertical opposite sides of the thermal management plate member. The thermal management plate member has a first thermally conductive surface 73 for regulating a temperature of the first battery module and a second thermally conductive surface 75 for regulating a temperature of the second battery module. The battery cells in each one of the battery modules are typically series connected. However, the battery cells can be connected in series or in parallel depending on desired level of voltage output from the battery modules.

Figure 3:
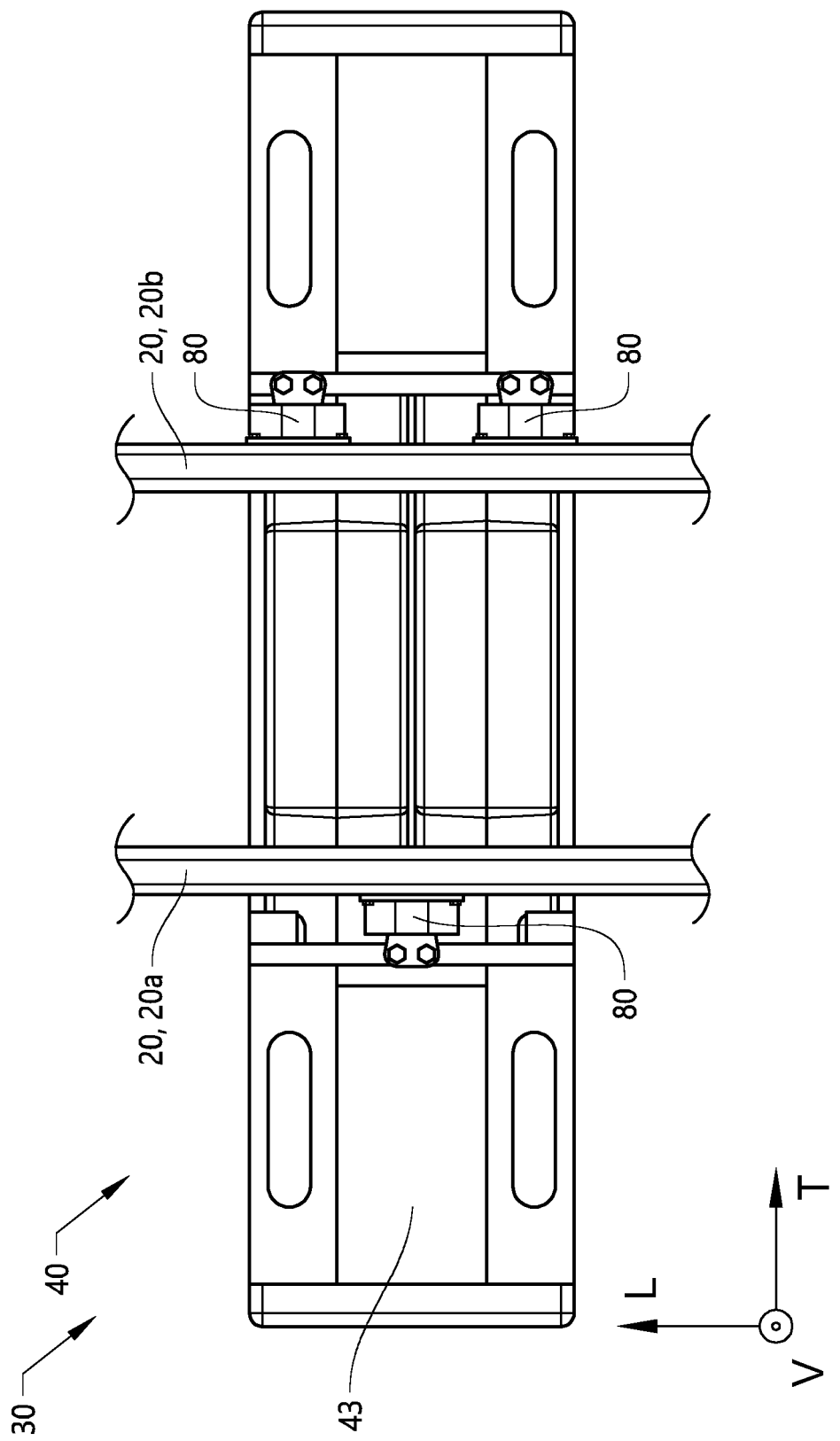
FIG. 3 is a top view of a battery pack arrangement according to an example embodiment of the present invention, in which the battery pack arrangement is suspension mounted to a vehicle frame.

As mentioned above, the battery pack arrangement 40 comprises the suspension attachment 80 for suspension mounting of the battery pack arrangement 40 to the vehicle frame 20. In particular, as illustrated in FIG. 2b, and also in FIGS. 3 and 4, the suspension attachment 80 is configured to attach the battery pack arrangement in a generally vertical orientation to the vehicle frame 20. FIG. 3 is a top view of the battery pack arrangement 40 in FIG. 2b, in which the battery pack arrangement is suspension mounted to the vehicle frame 20, e.g. at the portions 20a and 20b. While now referring to FIG. 4, which is a front view of the battery pack arrangement in FIG. 3, the battery pack arrangement 40 is arranged below a vertical upper surface VV of the vehicle frame 20. Typically, the vertical upper region, e.g. a vertical upper surface VB of the battery pack arrangement 40 is suspension mounted to the vehicle frame such that the vertical upper surface VV is essentially in parallel with the vehicle frame 20, e.g. parallel with a horizontal center plane VC of the vehicle frame 20.

Figure 4:
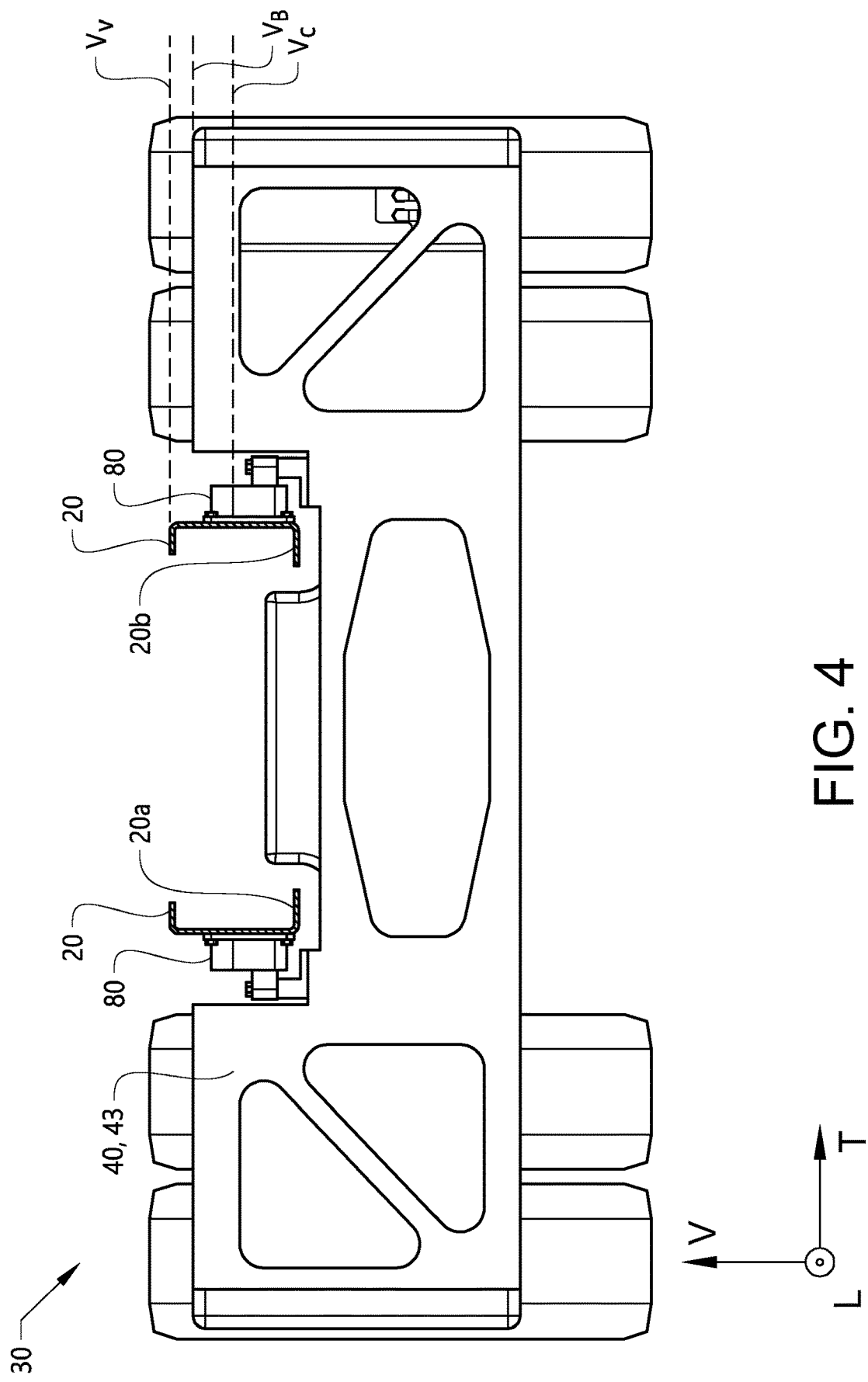
FIG. 4 is a front view of the battery pack arrangement in FIG. 3, according to one example embodiment of the invention.

Typically, as illustrated in FIG. 4, when the battery pack arrangement 40 is suspension mounted to the vehicle frame 20, a substantial part of the battery pack arrangement is located underneath the vehicle frame 20, as seen in the vertical direction V. By way of example, a substantial part of the battery pack arrangement is located underneath the vehicle frame 20 such that the substantial part of the battery pack arrangement is located below the vertical center plane VC of the vehicle frame 20, as may be gleaned from FIG. 4.

In this example, the battery pack arrangement is arranged along the longitudinal direction of the vehicle frame and between a first ground engaging member 92 and a second ground engaging member 94. In other words, the battery pack arrangement is arranged within the wheelbase of the vehicle frame (i.e. within the wheelbase of the vehicle).

As mentioned above in relation to FIG. 2a, also the example embodiment described in relation to FIGS. 2b, 3 and 4 includes an suspension attachment comprising 80 a plurality of transversely spaced-apart attachment points 45a, 45b and optionally 45c. The attachment points enable the battery pack arrangement to attach to the vehicle frame at transversely opposite sides 20a and 20b. As illustrated in FIG. 5b, the spaced-apart attachment points 45a, 45b and 45c are also spaced-apart in the longitudinal direction L. the suspension attachment here includes a dampener (not shown). In particular, each one of the attachment points comprises a dampener. For example, each one of the attachment points comprises one or more bolts as fasteners and a dampener. In the FIG. 5b, each attachment points has a number of four fasteners and a dampener arranged between the fasteners and the batter pack arrangement, thereby forming the suspension attachment.

It should be noted that the example embodiment as described in relation to FIGS. 3 and 4 are also equally applicable to the example embodiment described in relation to FIG. 2a.

Figure 5A:
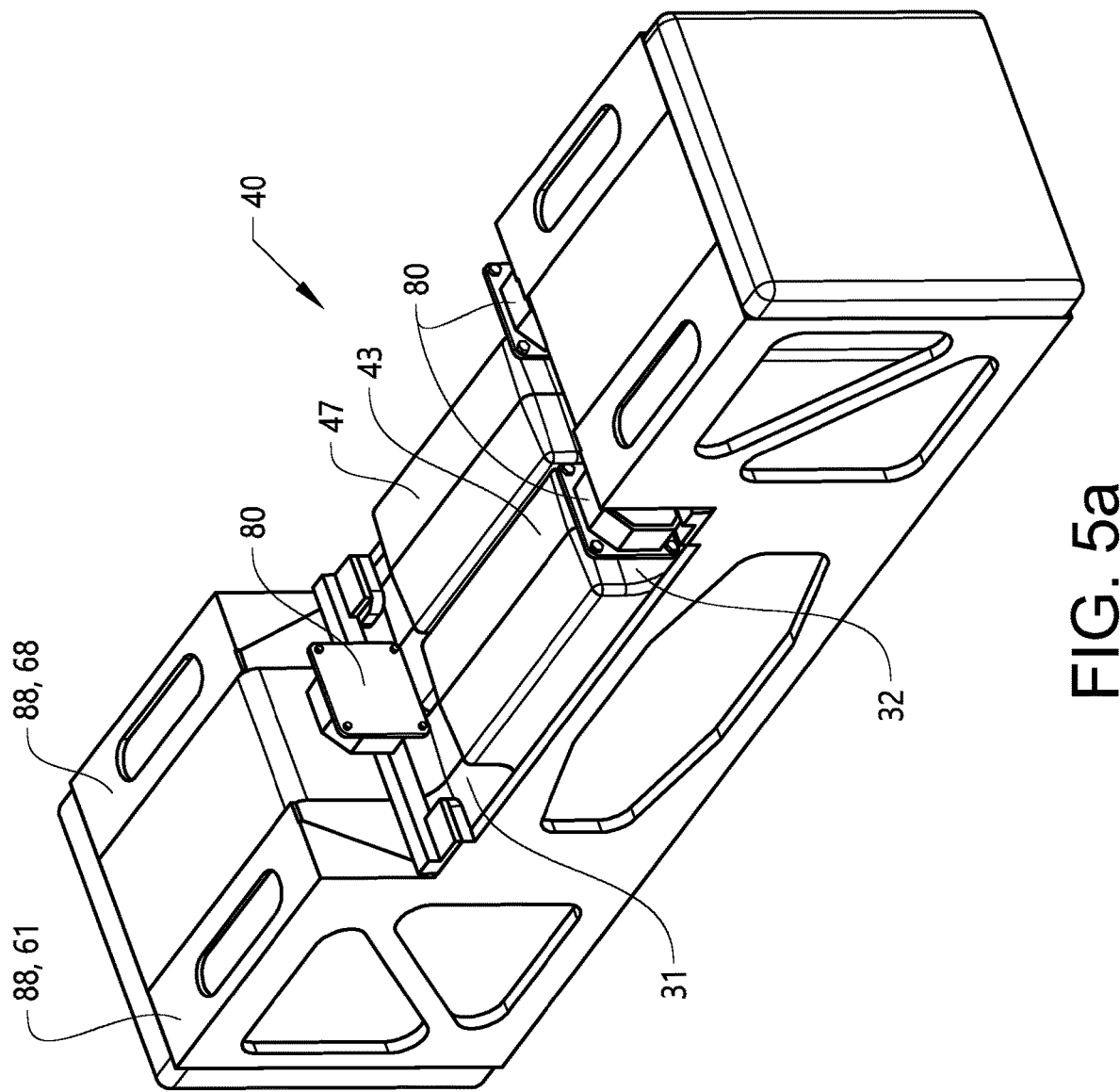
FIG. 5*a* is a perspective view of a battery pack arrangement according to an example embodiment of the present invention.
Figure 5B:
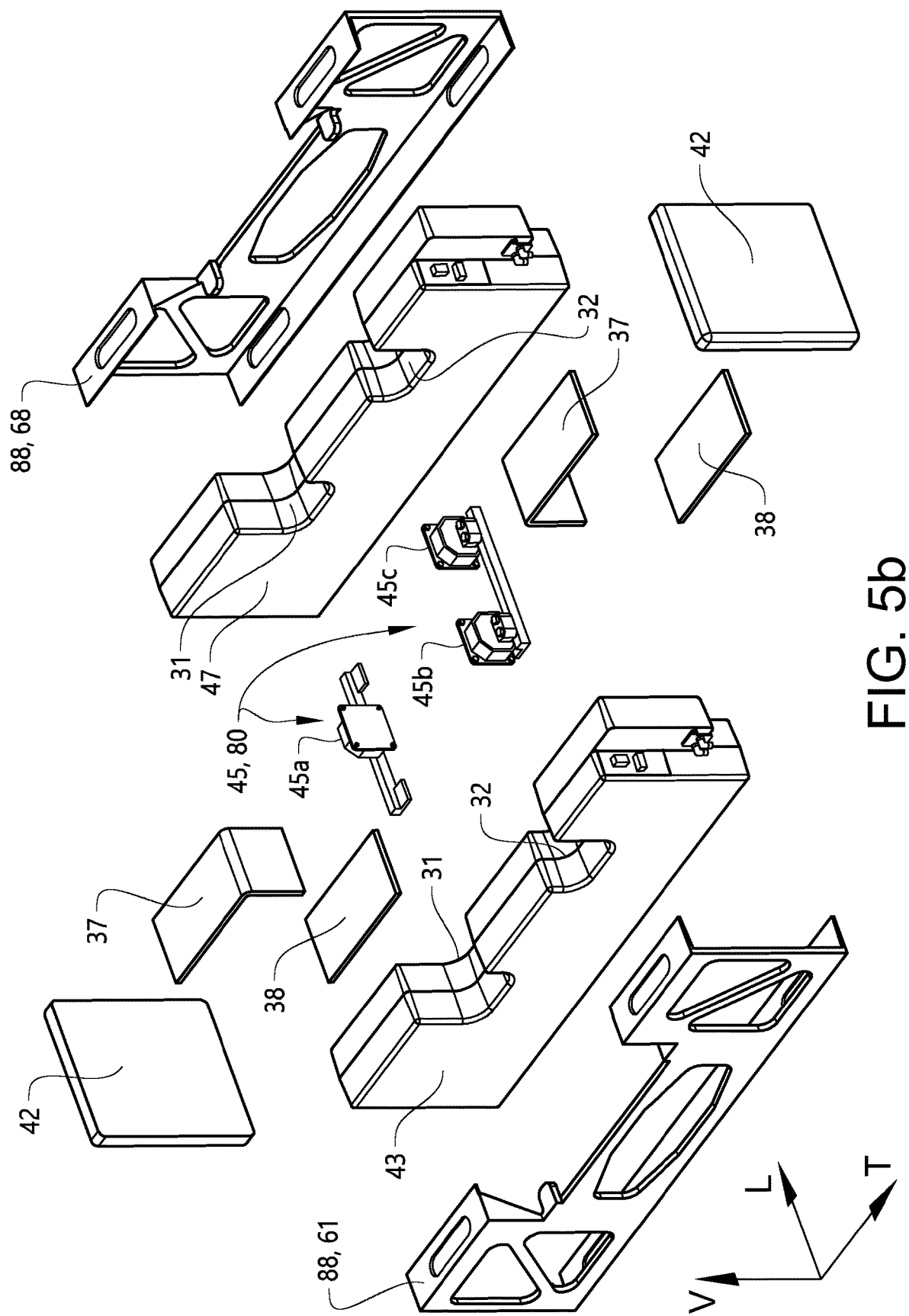
FIG. 5*b* is an exploded view of the battery pack arrangement in FIG. 5*a*, according to an example embodiment of the present invention.

Turning now to FIGS. 4, 5a and also 5b, the battery pack arrangement 40 is typically shaped to accommodate a bottom part 20a, 20b of the vehicle frame 20. FIG. 5a is a perspective view of the battery pack arrangement according to an example embodiment of the present invention, in which the battery pack arrangement comprises a first battery pack 43 and a second battery pack 47, while FIG. 5b is an exploded view of the battery pack arrangement in FIG. 5a. However, the features and examples described in relation to FIGS. 5a and 5b are likewise applicable to the example of the battery pack arrangement in FIG. 2a, as long as there is no contradictions or the opposite is not explicitly mentioned. By way of example, the battery pack arrangement has a first longitudinal outer recess 31 and a second longitudinal outer recess 32. The first longitudinal outer recess 31 and the second longitudinal outer recess 32 are configured to accommodate the bottom part 20a and bottom part 20b of the vehicle frame, respectively. As illustrated in e.g. FIG. 5b, each one of the battery pack 43, 47 comprises a first longitudinal outer recess 31 for accommodating a portion of the vehicle frame and a second longitudinal outer recess 32 for accommodating another portion of the vehicle frame. When the suspension attachment comprises a plurality of spaced-apart attachment points, such as the three-point suspension attachment 45 in FIGS. 5a and 5b, i.e. three attachment points 45a, 45b and 45c, one of the attachment points 45a is disposed along the first longitudinal outer recess 31 and the other attachment points 45b, 45c are disposed along the second longitudinal outer recess 32. The attachment points may, however, be distributed in another manner.

Optional, the battery pack arrangement further comprises a support structure 88 for supporting the battery pack, as illustrated in e.g. FIGS. 5a and 5b. As shown in the FIGS. 5a and 5b, the support structure 88 is configured to contain the first battery pack 43 and the second battery pack 47. Moreover, in this example, the suspension attachment 80 is arranged on the support structure 88. The support structure 88 is thus arranged to at least partly encompassing the battery packs 43, 47. In this example, the support structure 88 comprises a first portion 61 releasable connected to a second portion 68. The first portion and the second portion are by way of example a first bracket and a second bracket. The first portion and the second portion can be releasable connected by fastening system, e.g. a number of bolts. In addition, or alternatively, the first portion and the second portion can be releasable connected by opposite transverse side portions 42. The transverse side portions can be provided in the form of side-impact protection member in order to protect the battery pack and the battery modules from side-impacts during use of the battery pack arrangement in the vehicle.

As mentioned above, in this example, the suspension attachment is arranged on the support structure. Further, in this example, the suspension attachment is arranged on one of the top portions 37 of the support structure. As illustrated in FIG. 5b, the support structure here also comprises a set of bottom portions 38. The bottom portions 38 can be provided as protection plates underneath the battery pack to protect the batteries from impacts and debris. Hence, the support structure encompasses the battery modules of the battery pack. It should be noted that the battery pack can be provided without the support structure, and the suspension attachment can be arranged on the battery pack at another part, e.g. directly or indirectly connected to the thermal management plate member 70.

It is to be noted that while the support structure of the battery pack arrangement illustrated in e.g. FIGS. 5*a* and 5*b* is a separate part of the arrangement connected to the battery pack, the support structure may likewise be an integral part of the arrangement. For example, the support structure may be part of any one of the first and second battery modules.

Figure 6:
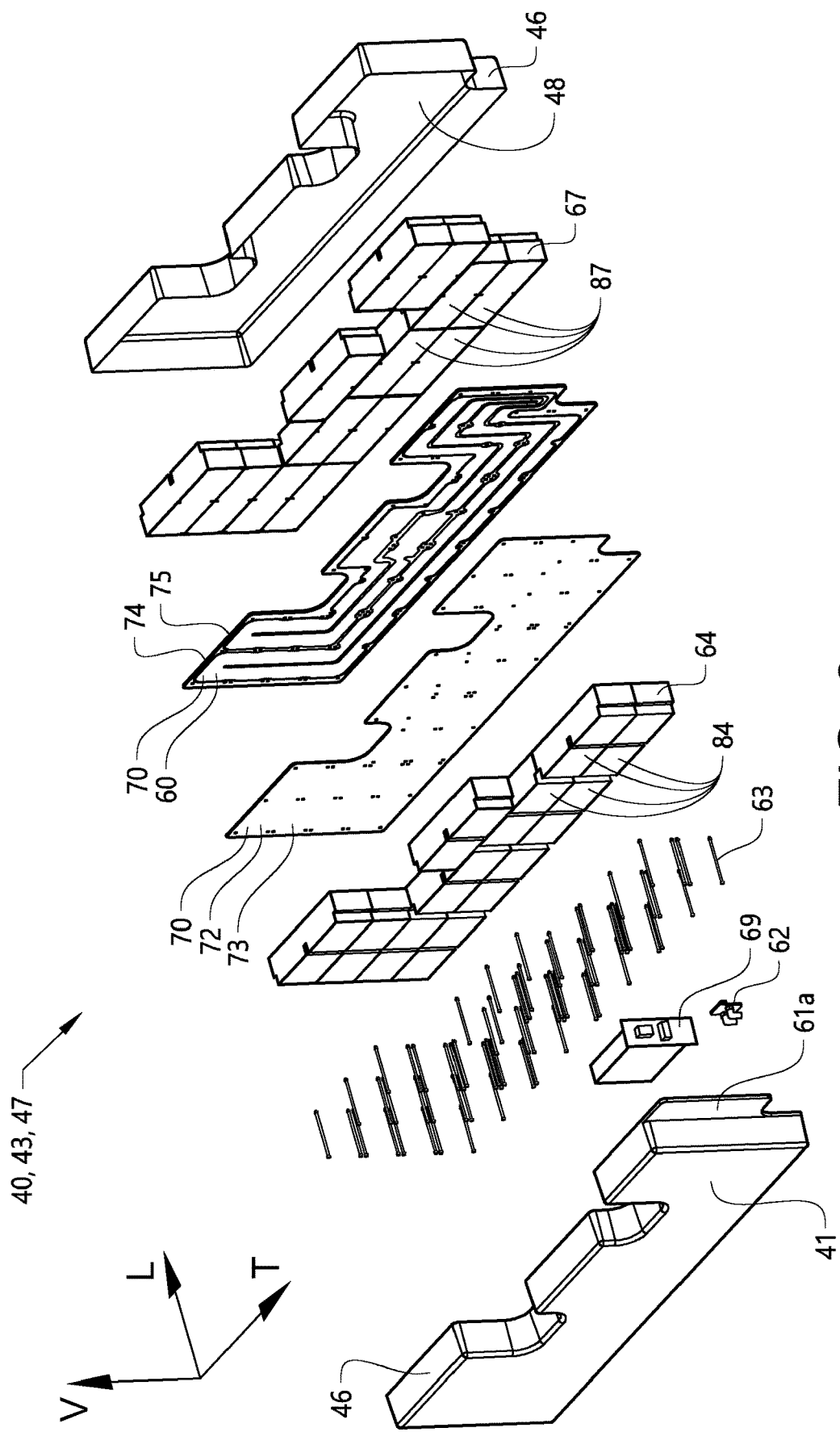
FIG. 6 is an exploded view of a battery pack arrangement according to an example embodiment of the present invention.

FIG. 6 is an exploded view of some features of a battery pack of the battery pack arrangement according to an example embodiment of the present invention. For ease of reference, the battery pack in FIG. 6 is here the battery pack 43. The battery pack 43 can either form the battery pack arrangement together with the suspension attachment (not shown), as in FIG. 2*b*, or form the battery pack arrangement together with additional battery packs and the suspension attachment, as in FIG. 2*a*. The battery pack 43 comprises the first battery module 64 with a first set of battery cells 84 and the second battery module 67 with a second set of battery cells 87. The thermal management plate member 70 is arranged therebetween, as seen in the longitudinal direction L. The first battery module 64 and the second battery module 67 are thus arranged on opposite sides 72, 74 of the thermal management plate member 70. The first battery module 64 and the second battery module 67 are installed vertically on both sides of the thermal management plate member. As mentioned above, the thermal management plate member comprises the first thermally conductive surface 73 for regulating a temperature of the first battery module and the second thermally conductive surface 75 for regulating a temperature of the second battery module. Further, the thermal management plate member is oriented generally in the vertical orientation to the battery modules 64 and 67. That is, the first thermally conductive surface 73 is a vertical oriented surface of the thermal management plate member, while the second thermally conductive surface 75 is a vertical oriented surface of the thermal management plate member. In addition, the first side of the thermal management plate member is a vertical oriented side of the thermal management plate member, while the second side of the thermal management plate member is a vertical oriented opposite side of the of the thermal management plate member.

Hence, as depicted in the FIG. 6, the first thermally conductive surface 73 for regulating a temperature of the first battery module 64 and the second thermally conductive surface 75 for regulating a temperature of the second battery module 67 corresponds to the opposite sides of the thermal management plate member. Moreover, the thermal management plate member comprises a fluid circuit 60 configured to define a fluid passageway for circulating a coolant there through. Further, the battery pack here includes a thermal management interface 62 having in- and out-connections for hoses. In other words, the fluid circuit has an inlet (not shown) for liquid inflow and an outlet (not shown) in fluid communication with the inlet, for outflow of the liquid. The fluid passageway is defined at least by the thermally conductive plate surfaces disposed on opposite sides of the channel, both plate surfaces are configured to be placed into thermal contact with one battery module comprising the battery cells. Further, the battery modules are connected to the thermal management plate member with the fastening member, which in this example is a number of screws and nuts 63 arranged through the battery modules on both sides and tightened together. As illustrated in FIG. 6, the thermal management plate member is an essentially flat plate member. In this example, the thermal management plate member is made of a conductive material such as aluminium. The thermal management plate member 70 has a channel that covers as large area as possible of the battery cells bottom footprint. The first side of the thermal management plate member 72 and the second side of the thermal management plate member 74 are connected to each other to provide mechanical stiffness to the battery pack. Further, the inner surfaces of the first side 72 and the second side 74 may each comprise silicone and rubber rings (not shown) for sealing between the sides 72, 74 when formed into the thermal management plate member. In other words, the thermal management plate member may be formed as a unit having opposite vertical sides 72, 74, or as a two-part thermal management plate member having opposite vertical sides 72, 74 joined to each other.

By way of example, the thermal management plate member 70 further comprises a liquid coolant in the channel, thereby forming a fluid circuit. The coolant in the fluid circuit is typically a liquid fluid medium. Accordingly, in the fluid circuit, a liquid coolant is transportable, typically with the aid of pump units (not shown). The coolant can be used to remove heat from the battery pack and also to provide heating of the pack for fast charging at low temperatures, and/or for more rapid cold start. Accordingly, the term "fluid" in the context of these example embodiments refers to a liquid fluid. The type of coolant may, however, vary depending on type of vehicle and type of installation. Typically, the coolant is water-based. By way of example, the coolant is water-based with the addition of glycols to prevent freezing and other additives to limit corrosion, erosion and cavitation etc.

Turning again to the battery modules, each one of the battery modules 64, 67 includes a plurality of battery cells 84, 87, respectively. The battery cells are arranged in a state in which the battery cells are connected in series to each other. The battery modules, and also the battery cells, are electrically connected to each other, while the thermal management plate member is connected to the battery modules such that the coolant in the thermal management plate member is permitted to regulate the temperature of each one of the battery modules.

Also, in order to further improve the contact between the battery modules and the thermal management plate member, it may be possible to arrange a so called gap filler between sides of the thermal management plate member and the first and second battery modules, respectively. The gap filler may be in the form of an acrylic material or a thin film.

In order to protect the battery cells from external contaminations, dust, dirt and humidity, the battery pack 43 is in this example provided with an envelope 46, as illustrated in FIG. 6. The envelope 46 encompasses the first battery module 64 and the second battery module 67. The envelope is typically a two-part envelope having a first portion 41 and a second portion 48. The envelope also encompasses the thermal management plate member 70. Moreover, the envelope also houses any other components of the first battery module and the second battery module. The envelope is e.g. made of a plastic material or a metal such as steel, stainless steel or the like. Typically, the material of the envelope should withstand humidity, thus being essentially made of a water-proof material. The parts of the envelope can be connected by means of a glue, bolts or any other fastener. In addition, or alternatively, one of the parts of the envelope may comprise a flange 61*a* for a robust sealing solution against the cooling plate (thermal management plate member), as shown in FIG. 6. Electric insulation and thermal insulation may also cover the inside parts of the envelope.

Further, the battery pack typically comprises an electrical box 69 with fuses etc. The electrical box can be arranged either internally of the battery modules or outside the battery modules. The electric box 69 (electrical connectors) and the thermal connectors 62 may be located along the transverse sides of the battery pack arrangement, and thus typically arranged on the transverse sides of the vehicle. In this manner, there is provided connector access for services etc.

It should be noted that the example embodiment of the battery pack as described in relation to FIGS. 3 to 6 are also equally applicable to the example embodiment described in relation to FIG. 2a. Hence, as described above, the electric vehicle as described above in relation to FIG. 1 thus comprises a vehicle frame arrangement comprising a vehicle frame and a battery pack arrangement according to any one of the example embodiments described in relation to the FIGS. 2a-2b in combination with the FIGS. 3-6.

The battery pack arrangement may also comprise a control unit (not shown). The control unit is connectable to the battery pack arrangement. That is, the control unit is adapted to control temperature regulation of the battery modules. By way of example, the control unit is adapted to set the level of the first and second temperatures, as mentioned above. In addition, or alternatively, the control unit can be a part of another system in the vehicle. For instance, the vehicle comprises the control unit to perform various operational steps of controlling the temperature of the battery pack arrangement. In other designs of the system and the vehicle, the control unit may be arranged in another remote location of the vehicle.

It is to be understood that the present invention is not limited to the embodiments described above and illustrated in the drawings; rather, the skilled person will recognize that many changes and modifications may be made within the scope of the appended claims.

The invention claimed is:

1. A battery pack arrangement for a vehicle, comprising a battery pack having a first battery module with a first set of battery cells, a second battery module with a second set of battery cells, and a thermal management member arranged therebetween, wherein the first battery module and the second battery module are arranged on opposite sides of the thermal management member, the thermal management member having a first thermally conductive surface for regulating a temperature of the first battery module and a second thermally conductive surface for regulating a temperature of the second battery module, wherein the battery pack arrangement further comprises a suspension attachment configured to attach the battery pack arrangement in an approximately vertical orientation to a vehicle frame of the vehicle, wherein the battery pack has a first longitudinal outer recess for accommodating a portion of the vehicle frame and a second longitudinal outer recess for accommodating another portion of the vehicle frame.

2. The battery pack arrangement according to claim 1, wherein the suspension attachment comprises a plurality of spaced-apart attachment points.

3. The battery pack arrangement according to claim 2, wherein at least one of the attachment points is disposed along the first longitudinal outer recess and at least one of the attachment points is disposed along the second longitudinal outer recess.

4. The battery pack arrangement according claim 1, further comprising a support structure arranged to at least partly encompass the battery pack.

5. The battery pack arrangement according to claim 4, wherein the suspension attachment is arranged on the support structure.

6. The battery pack arrangement according to claim 1, wherein the battery pack is a first battery pack, and the battery pack arrangement further comprises a second battery pack.

7. The battery pack arrangement according to claim 1, wherein the first thermally conductive surface for regulating a temperature of the first battery module and the second thermally conductive surface for regulating a temperature of the second battery module corresponds to the opposite sides of the thermal management member.

8. The battery pack arrangement according to claim 1, wherein the thermal management member comprises a fluid circuit configured to define a fluid passageway for circulating a coolant therethrough.

9. A vehicle comprising a battery pack arrangement according to claim 1.

10. The battery pack arrangement according to claim 1, wherein the first battery module and the second battery module are fixedly attached to the thermal management conductive member.

* * * * *